United States Patent
He et al.

(10) Patent No.: US 12,047,267 B2
(45) Date of Patent: Jul. 23, 2024

(54) BANDWIDTH TESTING METHOD AND APPARATUS, AND STORAGE MEDIUM

(71) Applicant: Suzhou Centec Communications Co., Ltd., Jiangsu (CN)

(72) Inventors: Zhichuan He, Jiangsu (CN); Wengang Wang, Jiangsu (CN); Lei Li, Jiangsu (CN); Maocong Zhao, Jiangsu (CN)

(73) Assignee: Suzhou Centec Communications Co., Ltd., Jiangsu (CN)

( * ) Notice: Subject to any disclaimer, the term of this patent is extended or adjusted under 35 U.S.C. 154(b) by 324 days.

(21) Appl. No.: 17/295,883

(22) PCT Filed: Jun. 5, 2019

(86) PCT No.: PCT/CN2019/090055
§ 371 (c)(1),
(2) Date: May 21, 2021

(87) PCT Pub. No.: WO2020/103423
PCT Pub. Date: May 28, 2020

(65) Prior Publication Data
US 2021/0399967 A1 Dec. 23, 2021

(30) Foreign Application Priority Data
Nov. 23, 2018 (CN) .......................... 201811410178.8

(51) Int. Cl.
*H04L 43/0882* (2022.01)
*H04L 43/0894* (2022.01)
*H04L 43/50* (2022.01)

(52) U.S. Cl.
CPC ...... *H04L 43/0882* (2013.01); *H04L 43/0894* (2013.01); *H04L 43/50* (2013.01)

(58) Field of Classification Search
CPC . H04L 43/0882; H04L 43/0894; H04L 43/50; H04L 43/0876; H04L 43/16;
(Continued)

(56) References Cited

U.S. PATENT DOCUMENTS

2010/0046533 A1* 2/2010 Kuramoto ............... H04L 47/10
370/401
2010/0061266 A1* 3/2010 Bugenhagen ........... H04L 47/74
370/253
(Continued)

FOREIGN PATENT DOCUMENTS

CN     1725718 A     1/2006
CN     101232459 A    7/2008
(Continued)

OTHER PUBLICATIONS

IEEE Communications Magazine • Mar. 2008; OAM_ethernet_transport_networks;Title: OAM and Its Performance Monitoring Mechanisms for Carrier Ethernet; Contributors: Jeong-dong Ryoo, Jongtae Song, Jaewoo Park, and Bheom-Soon Joo, ETRI; (Year : 2008).*

*Primary Examiner* — Mohammed S Chowdhury
(74) *Attorney, Agent, or Firm* — Samson G. Yu

(57) ABSTRACT

The present disclosure provides a bandwidth testing method and apparatus, and a storage medium. The method includes: sending, by a sending end, service messages and operation administration and maintenance (OAM) messages, wherein a bandwidth of the OAM messages is a maximum bandwidth of the service messages; discarding, by the sending end, partial OAM messages, wherein the partial OAM messages are a part of the OAM messages which makes a sum of bandwidths of the service messages and the OAM messages exceed a maximum bandwidth; acquiring, by the sending end, a total bit number of the partial OAM messages that are discarded and time for sending the service messages
(Continued)

and the OAM messages; and determining, a bandwidth occupied by the service messages according to the total bit number and the time.

14 Claims, 2 Drawing Sheets

(58) Field of Classification Search
CPC ....... H04L 43/08; H04L 47/20; H04L 1/0003; H04L 47/12; H04L 47/2408; H04L 47/26; H04W 8/04; H04W 28/12; H04W 28/18; H04W 28/0289
See application file for complete search history.

(56) References Cited

U.S. PATENT DOCUMENTS

2012/0163224 A1* 6/2012 Long .................... H04L 45/306
370/252
2016/0301571 A1* 10/2016 Wang ................. H04L 41/0893

FOREIGN PATENT DOCUMENTS

| CN | 102325060 A | 1/2012 |
| CN | 102487330 A | 6/2012 |
| CN | 103152228 A | 6/2013 |
| CN | 106487613 A | 3/2017 |
| CN | 109547287 A | 3/2019 |
| WO | 2012145886 A1 | 11/2012 |

\* cited by examiner

BANDWIDTH TESTING METHOD AND
APPARATUS, AND STORAGE MEDIUM

CROSS REFERENCE

This application is a National Stage Filing of the PCT International Application No. PCT/CN2019/090055 filed on Jun. 5, 2019, which claims priority to a Chinese Application No. 201811410178.8 filed on Nov. 23, 2018, the entirety of which is herein incorporated by reference.

TECHNICAL FIELD

The present disclosure relates to the field of communication, and in particular to a bandwidth testing method and apparatus, and a storage medium.

BACKGROUND

At present, a specified bandwidth is generally set for a service in a network. For specifying the bandwidth reasonably or updating the bandwidth reasonably, an idle bandwidth based on the service needs to be tested frequently to determine whether the bandwidth is set reasonably.

According to the related art, service data needs to be stopped, and then a special message is sent for testing under the condition that the bandwidth is completely idle.

In view of problems in the related art that the bandwidth can be tested only after a service flow is stopped, which makes the bandwidth testing mode complex and results in that a test cannot be conducted whenever necessary, no effective technical solution has been proposed yet.

SUMMARY

The embodiments of the present disclosure provide a bandwidth testing method and apparatus, and a storage medium, which may solve problems in the related art that a bandwidth can be tested only after a service flow is stopped, which makes the bandwidth testing mode complex and results in that a test cannot be conducted whenever necessary.

According to some embodiments of the present disclosure, a bandwidth testing method is provided. The bandwidth testing method includes: sending, by a sending end, service messages and operation administration and maintenance (OAM) messages, wherein a bandwidth of the OAM messages is a maximum bandwidth of the service messages; discarding, by the sending end, partial OAM messages, wherein the partial OAM messages are a part of the OAM messages which makes a sum of bandwidths of the service messages and the OAM messages exceed a maximum bandwidth; acquiring, by the sending end, a total bit number of the partial OAM messages that are discarded and time for sending the service messages and the OAM messages; and determining a bandwidth occupied by the service messages according to the total bit number and the time.

According to some other embodiments of the present disclosure, a bandwidth testing apparatus applied to a sending end is provided. The bandwidth testing apparatus includes: a sending module, configured to send service messages and OAM messages, wherein a bandwidth of the OAM messages is a maximum bandwidth of the service messages; a discarding module, configured to discard partial OAM messages, wherein the partial OAM messages are a part of the OAM messages which makes a sum of bandwidths of the service messages and the OAM messages exceed a maximum bandwidth; a first acquiring module, configured to acquire a total bit number of the partial OAM messages that are discarded and time for sending the service messages and the OAM messages; and a first determining module, configured to determine a bandwidth occupied by the service messages according to the total bit number and the time.

According to some other embodiments of the present disclosure, a storage medium is provided, and a computer program is stored in the storage medium, wherein the computer program is configured to execute any bandwidth testing method mentioned above at runtime.

According to the embodiments of the present disclosure, the service messages and the OAM messages are sent and the bandwidth of the OAM messages is set to be the maximum bandwidth of the service messages, partial OAM messages, which are a part of the OAM messages which makes the sum of bandwidths of the service messages and the OAM messages exceed the maximum bandwidth, are discarded, and then the bandwidth occupied by the service messages can be determined according to the total bit number of the partial OAM messages that are discarded and the time for sending the service messages and the OAM messages. By means of the above technical solution, the problems in the related art that the bandwidth can be tested only after the service flow is stopped, which makes the bandwidth testing mode complex and results in that a test cannot be conducted whenever necessary, are solved.

BRIEF DESCRIPTION OF THE DRAWINGS

The drawings described herein are used to provide further understanding of the present disclosure, which form a part of the disclosure, and illustrative embodiments of the present disclosure and the description thereof are used to explain the present disclosure, which are not intended to unduly limit the present disclosure. In the drawings.

DETAILED DESCRIPTION OF THE EMBODIMENTS

Figure 1:
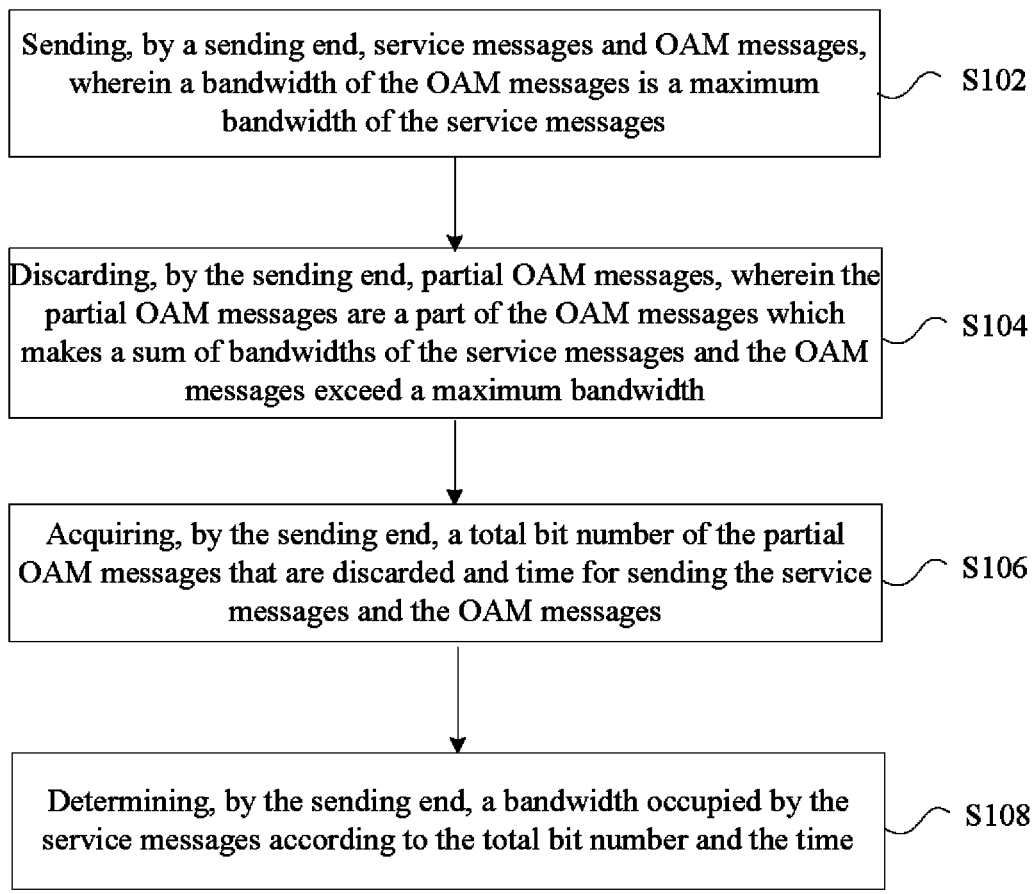
FIG. 1 is a flow diagram of a bandwidth testing method according to some embodiments of the present disclosure.

The present disclosure is described in detail below with reference to the drawings and the embodiments. It has to be noted that on the premise of no contradiction, embodiments in the disclosure and features of the embodiments may be combined mutually.

It should be noted that the terms "first", "second", etc., in the specification and claims of the present disclosure and in the drawings, are used to distinguish between similar objects and not necessarily to describe a particular order or sequential order.

Some embodiments of the present disclosure provide a bandwidth testing method. FIG. 1 is a flow diagram of the bandwidth testing method according to some embodiments of the present disclosure. As shown in FIG. 1, the method includes the following operations.

At S102, a sending end sends service messages and OAM messages, wherein a bandwidth of the OAM messages is a maximum bandwidth of the service messages.

At S104, the sending end discards partial OAM messages, wherein the partial OAM messages are a part of the OAM messages which makes a sum of bandwidths of the service messages and the OAM messages exceed a maximum bandwidth.

At S106, the sending end acquires a total bit number of the partial OAM messages that are discarded and time for sending the service messages and the OAM messages.

At S108, the sending end determines a bandwidth occupied by the service messages according to the total bit number and the time.

According to the embodiments of the present disclosure, the service messages and the OAM messages are sent and the bandwidth of the OAM messages is set to be the maximum bandwidth of the service messages, partial OAM messages, which are a part of the OAM messages which makes the sum of bandwidths of the service messages and the OAM messages exceed the maximum bandwidth, are discarded, and then the bandwidth occupied by the service messages can be determined according to the total bit number of the partial OAM messages that are discarded and the time for sending the service messages and the OAM messages. By means of the above technical solution, problems in the related art that the bandwidth can be tested only after a service flow is stopped, which makes the bandwidth testing mode complex and results in that a test cannot be conducted whenever necessary, are solved, and a process of bandwidth testing is simplified, so that the bandwidth can be tested without stopping the service flow.

The sending end acquires the total bit number of the partial OAM messages that are discarded in the following manner: the sending end acquires a number X of the partial OAM messages that are discarded and a bit number Y of each of the OAM messages, wherein the total bit number Z is determined according to the following formula: $Z = X \times Y$.

Based on the above technical solution for determining the total bit number, at least one of a bandwidth occupied by the service messages and an idle bandwidth in the maximum bandwidth is determined according to the total bit number and the time. For example, at least one of the bandwidth H1 occupied by the service messages and the idle bandwidth H2 in the maximum bandwidth is determined according to the following formulas: $H1 = Z \div T$, $H2 = M - H1$, wherein Z is the total bit number, T is the time, and M is the maximum bandwidth. Alternatively, $H2 = N \div T$, where N is a total bit number of OAM messages received by a receiving end, and T is the time for sending the service messages and the OAM messages.

It should be noted that before executing S102, the sending end enables a flow-based Flow Policer mechanism in an egress direction of the service messages to discard, when the receiving end receives the OAM messages with the maximum bandwidth, the partial OAM messages.

Through the description of the above embodiments, those skilled in the art may clearly understand that the method according to the above embodiments may be implemented by means of software and a necessary general hardware platform, and of course it may also be implemented by hardware, but in many cases the former is a better embodiment. Based on this understanding, the technical solution of the present disclosure or substantially a part thereof, which makes a contribution to the related art, may be embodied in a form of a software product, and the computer software product is stored in a storage medium (such as ROM/RAM, a magnetic disk, an optical disk) and includes several instructions to make a terminal device (such as a mobile phone, a computer, a server, a network device, etc.) execute the methods of all the embodiments of the present disclosure.

This embodiment further provides a bandwidth testing apparatus, which is configured to realize the above embodiments and exemplary embodiments, and will not be repeated herein. As used below, a term "module" may be a combination of software and/or hardware that implements a predetermined function. Although the apparatus described in the following embodiments is preferably implemented by software, implementation of hardware, or a combination of software and hardware, is also possible and contemplated.

Figure 2:
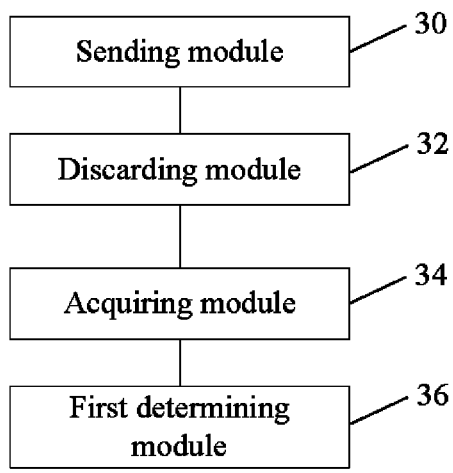
FIG. 2 is a structure diagram of a bandwidth testing apparatus according to some embodiments of the present disclosure.

FIG. 2 is a structure diagram of the bandwidth testing apparatus according to some embodiments of the present disclosure. As shown in FIG. 2, the apparatus includes:

a sending module 30, configured to send service messages and OAM messages, wherein a bandwidth of the OAM messages is a maximum bandwidth of the service messages;

a discarding module 32, configured to discard partial OAM messages, wherein the partial OAM messages are a part of the OAM messages which makes a sum of bandwidths of the service messages and the OAM messages exceed a maximum bandwidth;

an acquiring module 34, configured to acquire a total bit number of the partial OAM messages that are discarded and time for sending the service messages and the OAM messages; and a first determining module 36, configured to determine a bandwidth occupied by the service messages according to the total bit number and the time.

According to the embodiments of the present disclosure, the service messages and the OAM messages are sent and the bandwidth of the OAM messages is set to be the maximum bandwidth of the service messages, partial OAM messages, which are a part of the OAM messages which makes the sum of bandwidths of the service messages and the OAM messages exceed the maximum bandwidth, are discarded, and then the bandwidth occupied by the service messages can be determined according to the total bit number of the partial OAM messages that are discarded and the time for sending the service messages and the OAM messages. By means of the above technical solution, problems in the related art that the bandwidth can be tested only after a service flow is stopped, which makes the bandwidth testing mode complex and results in that a test cannot be conducted whenever necessary, are solved, and a process of bandwidth testing is simplified, so that the bandwidth can be tested without stopping the service flow.

In some exemplary implementations, the acquiring module 34 is further configured to acquire a number X of the partial OAM messages that are discarded and a bit number Y of each of the OAM messages, wherein the total bit number Z is determined according to the following formula $Z = X \times Y$.

In some exemplary implementations, the first determining module 36 is further configured to determine a bandwidth H1 occupied by the service messages.

Figure 3:
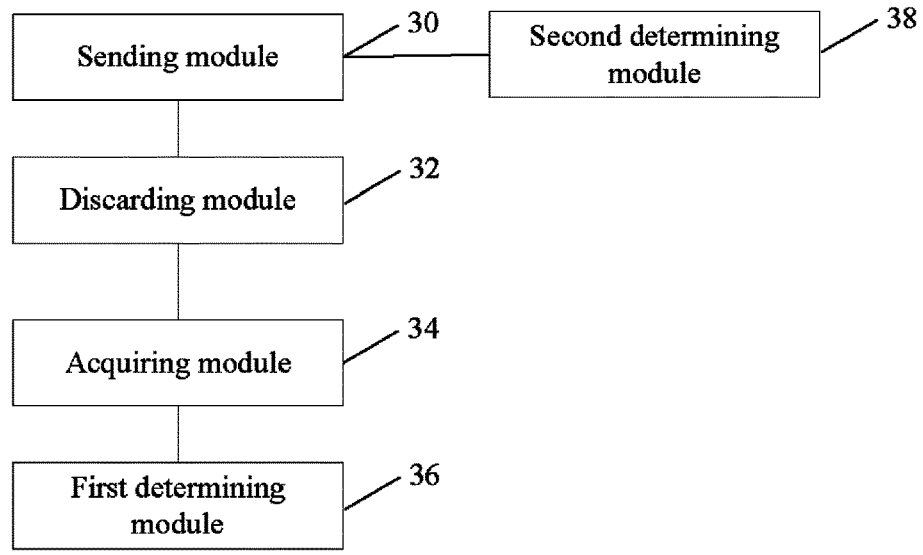
FIG. 3 is another structure diagram of a bandwidth testing apparatus according to some embodiments of the present disclosure.

As shown in FIG. 3, the apparatus further includes: a second determining module 38 configured to determine an idle bandwidth H2 in the maximum bandwidth, wherein $H1 = Z \div T$, $H2 = M - H1$, wherein Z is the total bit number, T is the time, and M is the maximum bandwidth; or $H2 = N \div T$, N is a total bit number of OAM messages received by a receiving end, and T is the time for sending the service messages and the OAM messages.

The sending module 30 is further configured to enable a flow-based Flow Policer mechanism in an egress direction of the service messages to discard, when the receiving end receives the OAM messages with the maximum bandwidth, the partial OAM messages.

It should be noted that the technical solutions of the above embodiments may be used in combination or independently, which is not limited by the embodiments of the present disclosure.

The following describes the above bandwidth testing flow with an exemplary embodiment, but is not used to limit the technical solutions of the embodiments of the present disclosure.

Figure 4:
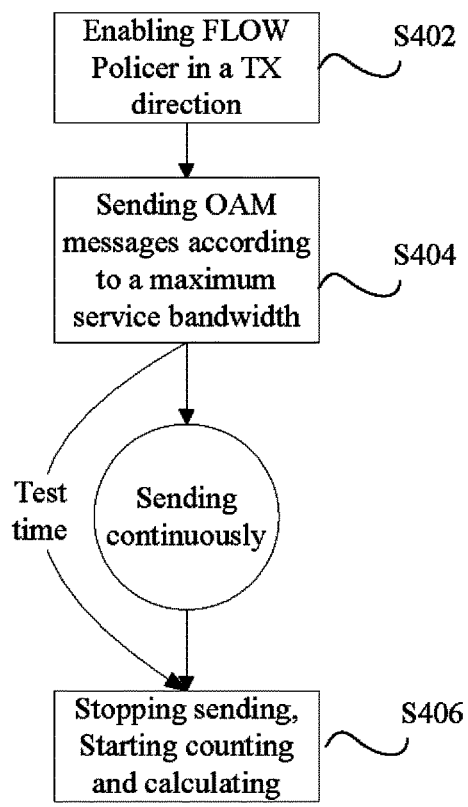
FIG. 4 is a flow diagram of a bandwidth testing of exemplary embodiments of the present disclosure.

FIG. 4 is a flow diagram of a bandwidth testing of an exemplary embodiment of the present disclosure. As shown in FIG. 4, the bandwidth testing process includes the following operations.

In the exemplary embodiments of the present disclosure, testing of the idle bandwidth is based on service and implemented based on common OAM messages and a Policer mechanism in QoS. For example, for service A, a maximum bandwidth of the service A is originally set to be 100G bps, and when it is required to test a bandwidth currently occupied by the service A or an idle bandwidth, the following operations can be used to implement the testing of the idle bandwidth.

At S402, a flow-based Flow Policer mechanism is enabled in an Egress direction of a sending end of the service A, wherein it is stipulated in the Policer mechanism that OAM messages are preferentially discarded when the number of messages exceeds 100G.

At S404, the sending end of the service A sends the OAM messages at a speed of 100G (a message size is Y bit for all OAM messages). In the process, service messages of the service A are normally sent without being affected.

At S406, after test time T, the number X of the discarded OAM messages is counted. The number X of the discarded OAM messages is converted to a total bit number, and then the total bit number is divided by the time so as to obtain the occupied bandwidth of the service messages (equivalent to H1 in the above embodiments). In addition, the idle bandwidth H (equivalent to H2 in the above embodiments) can be obtained by subtracting the occupied bandwidth of the service messages from the maximum bandwidth 100G of the service A.

Specifically, H=100G-X*Y/T. Alternatively, it is also feasible to count the number of OAM messages received by an opposite end, and the number of the OAM messages received by the opposite end is converted to the total bit number and then the total bit number is divided by the time so as to obtain the idle bandwidth.

To sum up, the above technical solution of the embodiments of the present disclosure may efficiently test the bandwidth whenever necessary, and no novel apparatus is needed additionally. The idle bandwidth of the service can be accurately tested by flexibly combining and applying existing tools and mechanisms. The above bandwidth testing process is preferably applied in a chip, and the chip is not limited to an application specific integrated circuit (ASIC) chip, but also includes a field programmable gate array (FPGA), a network processor (NP), or the like.

The embodiments of the present disclosure further provide a storage medium, and the storage medium includes a stored computer program, wherein the above computer program executes any method mentioned above at runtime.

In some exemplary implementations, the above storage medium may be configured to store a program code for executing the following operations.

At S1, a sending end sends service messages and OAM messages, wherein a bandwidth of the OAM messages is a maximum bandwidth of the service messages.

At S2, the sending end discards partial OAM messages, wherein the partial OAM messages are a part of the OAM messages which makes a sum of bandwidths of the service messages and the OAM messages exceed a maximum bandwidth.

At S3, the sending end acquires a total bit number of the partial OAM messages that are discarded and time for sending the service messages and the OAM messages.

At S4, the sending end determines a bandwidth occupied by the service messages according to the total bit number and the time.

In some exemplary implementations, the above storage medium may include, but is not limited to, a USB flash drive, a read-only memory (ROM), a random access memory (RAM), a mobile hard disk, a magnetic disk, an optical disk, and other media that may store program codes.

Specific examples in this embodiment may refer to examples described in the above embodiments and optional embodiments, which will not be repeated in this embodiment herein.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A bandwidth testing method performed by a bandwidth testing apparatus, comprising:
   sending, by a sending end, service messages and operation administration and maintenance (OAM) messages, wherein a bandwidth of the OAM messages is a maximum bandwidth of the service messages;
   discarding, by the sending end, partial OAM messages, wherein the partial OAM messages are a part of the OAM messages which makes a sum of bandwidths of the service messages and the OAM messages exceed a maximum bandwidth;
   acquiring, by the sending end, a total bit number of the partial OAM messages that are discarded and time for sending the service messages and the OAM messages; and determining, by the sending end, a bandwidth occupied by the service messages according to the total bit number and the time, wherein determining, by the sending end, the bandwidth occupied by the service messages according to the total bit number and the time comprises: determining the bandwidth H1 occupied by the service messages according to following formula: H1=Z÷T, wherein Z is the total bit number, and T is the time.

2. The bandwidth testing method according to claim 1, wherein acquiring, by the sending end, the total bit number of the partial OAM messages that are discarded comprises:
acquiring, by the sending end, a number X of the partial OAM messages that are discarded and a bit number Y of each of the OAM messages,
wherein the total bit number Z is determined according to following formula: Z=X×Y.

3. The bandwidth testing method according to claim 2, wherein before sending, by the sending end, the service messages and the OAM messages, the method further comprises:
enabling, by the sending end, a flow-based Flow Policer mechanism in an egress direction of the service messages to make the sending end discard the partial OAM messages.

4. The bandwidth testing method according to claim 1, wherein after sending, by the sending end, the service messages and the OAM messages, the method further comprises:
determining an idle bandwidth H2 in the maximum bandwidth according to one of following formulas:
H2=M−H1, wherein M is the maximum bandwidth; and
H2=N÷T, wherein N is the total bit number of the OAM messages received by a receiving end, and T is the time for sending the service messages and the OAM messages.

5. The bandwidth testing method according to claim 4, wherein before sending, by the sending end, the service messages and the OAM messages, the method further comprises:
enabling, by the sending end, a flow-based Flow Policer mechanism in an egress direction of the service messages to make the sending end discard the partial OAM messages.

6. The bandwidth testing method according to claim 1, wherein before sending, by the sending end, the service messages and the OAM messages, the method further comprises:
enabling, by the sending end, a flow-based Flow Policer mechanism in an egress direction of the service messages to make the sending end discard the partial OAM messages.

7. A bandwidth testing apparatus, applied to a sending end and comprising a memory storing instructions and a processor in communication with the memory, wherein the processor is configured to execute the instructions to:
send service messages and operation administration and maintenance (OAM) messages, wherein a bandwidth of the OAM messages is a maximum bandwidth of the service messages;
discard partial OAM messages, wherein the partial OAM messages are a part of the OAM messages which makes a sum of bandwidths of the service messages and the OAM messages exceed a maximum bandwidth;
acquire a total bit number of the partial OAM messages that are discarded and time for sending the service messages and the OAM messages; and
determine a bandwidth occupied by the service messages according to the total bit number and the time, wherein the processor is further configured to execute the instructions to determine the bandwidth H1 occupied by the service messages according to following formula: H1=Z÷T, wherein Z is the total bit number, and T is the time.

8. The bandwidth testing apparatus according to claim 7, wherein the processor is further configured to execute the instructions to acquire a number X of the partial OAM messages that are discarded and a bit number Y of each of the OAM messages, wherein the total bit number Z is determined according to following formula: Z=X×Y.

9. The bandwidth testing apparatus according to claim 7, wherein the processor is further configured to execute the instructions to:
determine an idle bandwidth H2 in the maximum bandwidth according to one of following formulas:
H2=M−H1, wherein M is the maximum bandwidth; and
H2=N÷T, wherein N is the total bit number of the OAM messages received by a receiving end, and T is the time for sending the service messages and the OAM messages.

10. The bandwidth testing apparatus according to claim 7, wherein the processor is further configured to execute the instructions to enable a flow-based Flow Policer mechanism in an egress direction of the service messages to discard the partial OAM messages.

11. A non-transitory storage medium storing a computer program, wherein the computer program is configured to execute following operations at runtime:
sending, by a sending end, service messages and operation administration and maintenance (OAM) messages, wherein a bandwidth of the OAM messages is a maximum bandwidth of the service messages;
discarding, by the sending end, partial OAM messages, wherein the partial OAM messages are a part of the OAM messages which makes a sum of bandwidths of the service messages and the OAM messages exceed a maximum bandwidth;
acquiring, by the sending end, a total bit number of the partial OAM messages that are discarded and time for sending the service messages and the OAM messages; and
determining, by the sending end, a bandwidth occupied by the service messages according to the total bit number and the time, wherein determining, by the sending end, the bandwidth occupied by the service messages according to the total bit number and the time comprises: determining the bandwidth H1 occupied by the service messages according to following formula: H1=Z÷T, wherein Z is the total bit number, and T is the time.

12. The non-transitory storage medium according to claim 11, wherein acquiring, by the sending end, the total bit number of the partial OAM messages that are discarded comprises:
acquiring, by the sending end, a number X of the partial OAM messages that are discarded and a bit number Y of each of the OAM messages,
wherein the total bit number Z is determined according to following formula: Z=X×Y.

13. The non-transitory storage medium according to claim 11, wherein the computer program is further configured to execute following operation at runtime after sending, by the sending end, the service messages and the OAM messages:

determining an idle bandwidth H2 in the maximum bandwidth according to one of following formulas:

H2=M−H1, wherein M is the maximum bandwidth; and

H2=N÷T, wherein N is the total bit number of the OAM messages received by a receiving end, and T is the time for sending the service messages and the OAM messages.

14. The non-transitory storage medium according to claim 11, wherein the computer program is further configured to execute following operation at runtime before sending, by the sending end, the service messages and the OAM messages enabling, by the sending end, a flow-based Flow Policer mechanism in an egress direction of the service messages to make the sending end discard the partial OAM messages.

\* \* \* \* \*